Nov. 19, 1929.     D. BEISINGER     1,736,571
SAW
Filed Sept. 21, 1926
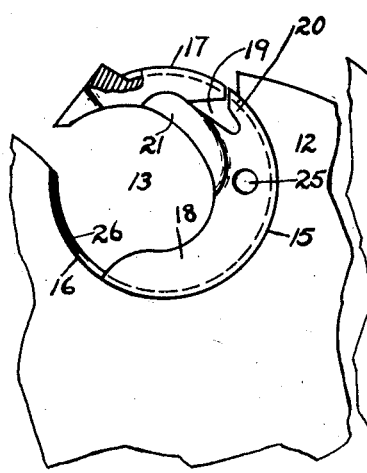
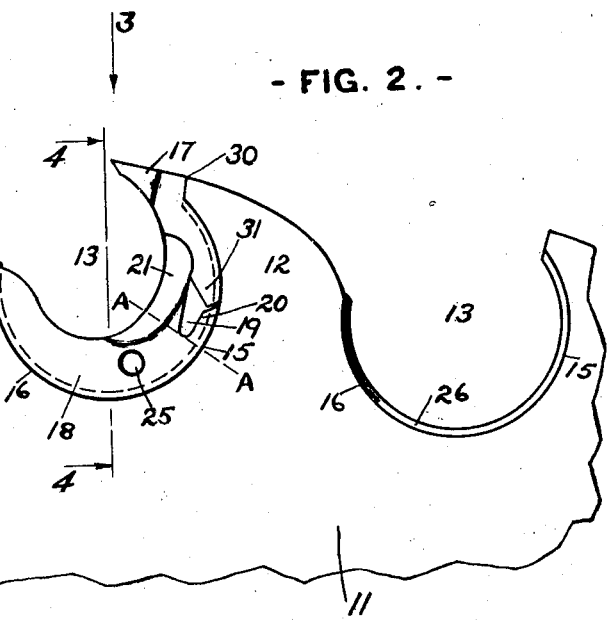
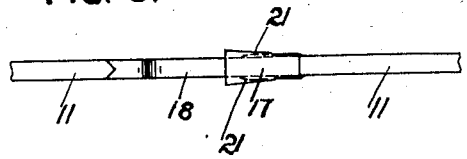
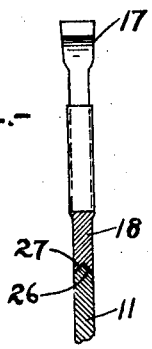
INVENTOR:
Daniel Beisinger
By Edmond Congar Brown
ATT'Y.

Patented Nov. 19, 1929

1,736,571

UNITED STATES PATENT OFFICE

DANIEL BEISINGER, OF NEW YORK, N. Y., ASSIGNOR TO R. HOE & CO., INC., OF NEW YORK, N. Y., A CORPORATION OF NEW YORK

SAW

Application filed September 21, 1926. Serial No. 136,821.

This invention relates to inserted tooth saws, and particularly to such saws as are specified, for instance, in U. S. Letters Patent No. 1,589,799, issued to Edward Foster on June 22, 1926, this invention being a modification of the invention set forth in said patent.

The invention has for one of its principal objects to provide an inserted tooth saw in which the teeth or bits are positively locked in the blade so that the liability of a bit to tip or rock sideways in the socket is reduced to a minimum; another object of the invention is to provide an inserted tooth having a shank portion in which the parts subject to bending strain are so shaped as to have no critical points where breakage is apt to occur. Other objects will appear from the following specification and the accompanying drawings.

The invention consists in the novel construction, arrangement and combination of various elements and parts, as set forth in the claim hereof, one embodiment of the same being illustrated in the accompanying drawings and described in this specification.

In the accompanying drawings,

Fig. 1 is a side view, partly in section, of a saw blade with the bit and holding shank only partially in position in the socket;

Fig. 2 is a view similar to Fig. 1, showing the shank and bit completely in locked position, and showing also an empty socket adapted to receive a bit and shank;

Fig. 3 is a view looking downward, that is, in the direction of the arrow 3 in Fig. 2, showing the shank inserted in the blade; and Fig. 4 is a sectional view of an inserted shank and bit, the section being taken on the line 4—4 of Fig. 2.

In carrying my invention into effect in the embodiment thereof which I have selected for illustration in the accompanying drawings and description in this specification, and referring particularly to the said drawings, 11 is a portion of a saw blade, this saw blade being provided with saw backs 12 between which are formed the sockets 13 in which the bits are held, these sockets being approximately circular in shape and having an open side and forming back walls 15 and front walls 16. These sockets are provided in the blade in any suitable or desired number and location.

The teeth or bits 17 are held in these sockets by shanks 18 having spring ends produced by forming a recess 19 in the said shank. One fork of the shank, lying on the inside of the recess between same and the gullet and designated 21, serves as a spring lock device to hold the bit in position, and also being thickened or reinforced, as will be best seen in Fig. 3, in order to better stand the strains which come upon the shank at this point. The other fork, 20, is shorter than the fork 21, and also has a spring action to hold the parts in position when assembled. Both of these forks are tapered, from a broad base to a narrower end, the object of which will be explained later.

The shanks may be provided with a hole 25 into which may be inserted a suitable tool for positioning the shanks and bits in the sockets. The sockets, as in the usual construction, are formed with ribs 26 adapted to co-operate with grooves 27 (see Fig. 4) formed in the backs of the teeth and the shanks.

As in the device shown in the Foster patent, the shanks and bits are so formed and positioned in the sockets that a powerful wedging effect is obtained between the shank and the back of the socket, so that the bits are positively locked in their sockets and cannot tip or spring sideways and run out of the line of cut in any ordinary use of the saw. This construction is obvious and will be clearly understood from an examination of the drawings.

It has been found in practice, however, that a shank constructed as previously known in the art, and referring now especially to a shank of the type such as is shown in the Foster Patent No. 1,589,799, will sometimes break at or about the base of the fork above referred to when subjected to work to which it is not adapted. In all such constructions it is necessary that the shank should have something of a spring action at the point where it comes into contact with the bit, but in devices previously known, this spring action has been attained by slotting or cutting out a portion of the shank as for instance as is shown in said Foster patent. I have devised an improvement in this type of saw which is particularly adapted to heavier work than that to which previously known types of saw are adapted, and according to my present invention I employ a shank having a cut away recess 19 and a reinforced portion 21, which co-operate to permit a spring action in the holding of the bit and also in strengthening a portion of the shank upon which a large part of the strain comes, so that while the bit is elastically but securely held in position, a breakage is practically impossible.

The taper construction of the shank which has been above referred to, is as follows: A recess 19 is formed in the shank, adjacent and below the location of the lower end of the bit. This recess bifurcates the upper end of the shank, separating it into two prongs or forks, a short fork 20 and a longer fork 21. The short bifurcated portion 20, in like manner as the rest of the outside ede of the shank, shares the groove 27 which engages with the ridge 26 of the socket and is thus locked against sidewise motion, although it has a slight spring effect against the edge of the socket. The longer fork 21, however, is that upon which very largely the principle of the present invention depends. By referring to Fig. 2 of the drawings and particularly to the bit 17 which is inserted in the left hand socket of the said figure, it will be seen that the sharpened cutting end of said bit is beveled on its inner or lower surface. When the saw is in operation, the entrance of this point and the operation of this beveled edge, of course, tend to throw the sharpened tooth upwards and outwards, because the same is a wedge, but a wedge having its slanting surface only on the inner or under side. The bit thereupon functions as a lever, the fulcrum of which is at the point designated 30, and as the cutting or outward end is forced upward and outward, the lower end 31 is consequently forced inward, against the spring fork 21, thus bringing a very substantial stress upon said fork, which in the devices hitherto known in the art, is very apt to break the same away from the main portion of the shank, such fracture usually occurring at the base of the spring fork, because in the structures previously known to the art, the fork is narrower at this point than elsewhere. In the present invention, however, I have devised a shank, recess, and spring fork member of such construction that the base portion of the spring fork 21, the same being the critical point at which fractures have been apt to occur in the devices known to the prior art, is broader than the remaining portion of the fork and is thereby eminently adapted to withstand the stresses which are thrown upon the shank when the inserted tooth saw is in use upon very heavy work. In Fig. 2 of the drawings I have indicated this critical line at A—A, and it will be seen that the base of the spring fork 21 along this line A—A is greater than at any other portion of the fork, in other words, the fork tapers from the base line A—A to the upward point thereeof, thus distributing the stress over the entire fork, instead of concentrating it at the weakened base portion as heretofore.

I do not limit myself to the particular form of construction here shown and described, as it is obvious that similar results can be obtained by certain modifications in the construction, without departing from the spirit and scope of the invention.

Having thus described my invention, what I claim as new and desire to secure by Letters Patent is as follows:

In an inserted tooth saw, the combination with a saw-blade having a socket provided with an inwardly projecting ridge, of a shank and a bit having a saw tooth adapted to fit in and be rotated in said socket, said shank and said bit each having a groove adapted to engage with said ridge, said shank having a uniform curved gullet defining boundary and a recess in its portion adjacent said bit whereby the upper end of said shank is bifurcated, the upwardly projecting member formed thereby on the side of said recess nearest the centre of the said socket being adapted to engage with said bit and being of continuously tapered construction from its base portion, said base portion being broader than any portion above said base, said member being strengthened by being laterally thickened toward the gullet face which thickening extends with the curve of the shank substantially beyond the bottom of the bifurcating recess, whereby a spring fork is formed adapted to resist without breakage the inward stress of the lower end of said bit during the operation of the saw.

In witness whereof I have hereunto signed my name this tenth day of September, 1926.

DANIEL BEISINGER.